United States Patent
Tsuji et al.

(10) Patent No.: US 11,467,315 B2
(45) Date of Patent: Oct. 11, 2022

(54) DETECTION RANGE SPECIFICATION MEMBER FOR HUMAN BODY DETECTION SENSOR AND TOILET

(71) Applicant: LIXIL Corporation, Tokyo (JP)

(72) Inventors: Kentarou Tsuji, Tokyo (JP); Hiroto Kutsuzawa, Tokyo (JP); Takuma Uchiyama, Tokyo (JP)

(73) Assignee: LIXIL Corporation, Tokyo (JP)

( * ) Notice: Subject to any disclaimer, the term of this patent is extended or adjusted under 35 U.S.C. 154(b) by 86 days.

(21) Appl. No.: 17/040,961

(22) PCT Filed: Mar. 20, 2019

(86) PCT No.: PCT/JP2019/011719
§ 371 (c)(1),
(2) Date: Sep. 23, 2020

(87) PCT Pub. No.: WO2019/188666
PCT Pub. Date: Oct. 3, 2019

(65) Prior Publication Data
US 2021/0026035 A1    Jan. 28, 2021

(30) Foreign Application Priority Data
Mar. 27, 2018 (JP) .............................. JP2018-059760

(51) Int. Cl.
*G01V 8/12* (2006.01)
*E03D 5/10* (2006.01)

(52) U.S. Cl.
CPC .............. *G01V 8/12* (2013.01); *E03D 5/105* (2013.01)

(58) Field of Classification Search
CPC ........... G01V 8/12; E03D 5/105; E03D 11/13; A47K 13/30
See application file for complete search history.

(56) References Cited

U.S. PATENT DOCUMENTS

| | | | |
|---|---|---|---|
| 9,869,581 B2 * | 1/2018 | Miura | G01J 1/4228 |
| 2019/0112797 A1 * | 4/2019 | Hirasawa | E03D 5/105 |

FOREIGN PATENT DOCUMENTS

| | | |
|---|---|---|
| JP | 2002-98772 A | 4/2002 |
| JP | 2004-333209 A | 11/2004 |
| JP | 2012-211845 A | 11/2012 |
| JP | 2013-181762 A | 9/2013 |
| JP | 2017-169901 A | 9/2017 |

* cited by examiner

*Primary Examiner* — David P Porta
*Assistant Examiner* — Meenakshi S Sahu
(74) *Attorney, Agent, or Firm* — Morrison & Foerster LLP

(57) ABSTRACT

A detection range specification member for a human body detection sensor is provided in a washroom and is configured to specify a detection range of a human body detection sensor having an infrared sensor body configured to detect a human body. The detection range specification member for the human body detection sensor includes a material that reduces transmission of infrared rays, and is provided so as to cover at least a part of the infrared sensor body. The detection range specification member for the human body detection sensor is a sheet member that is configured to allow installation on a sensor surface side of the infrared sensor body.

12 Claims, 8 Drawing Sheets

DETECTION RANGE SPECIFICATION MEMBER FOR HUMAN BODY DETECTION SENSOR AND TOILET

CROSS-REFERENCE TO RELATED APPLICATIONS

This application is a national stage application under 35 USC 371 of International Application No. PCT/JP2019/011719, filed Mar. 20, 2019, which claims the priority of Japanese Application No. 2018-059760, filed Mar. 27, 2018, the entire contents of each of which are incorporated herein by reference.

FIELD OF THE DISCLOSURE

The disclosure relates to a detection range specification member for a human body detection sensor and a toilet.

BACKGROUND OF THE DISCLOSURE

A human body detection sensor is provided in a washroom (including a sanitary space) where facilities using water such as a toilet and a washbasin are installed. There is known a system in that when a human body detection sensor detects a user who has entered the washroom, a toilet lid of a toilet is automatically opened or a light is automatically turned on (for example, refer to Patent Document 1).
Patent Document 1: Japanese Unexamined Patent Application, First Publication No. 2017-169901

SUMMARY OF THE DISCLOSURE

However, in the system in which the toilet lid of the toilet is opened when the human body detection sensor detects the human body, even in a case where the user enters the washroom to use the washbasin, such an unnecessary operation that the human body detection sensor detects the user and the toilet lid of the toilet is opened may be performed. For this reason, it is necessary to individually specify the detection range of the human body detection sensor in accordance with the form of the washroom such that the toilet lid of the toilet is opened in a case where the user approaches the toilet and the light is turned on without opening the toilet lid in a case where the user uses the washbasin.

However, in order to specify the detection range of the human body detection sensor in accordance with the form of the washroom, there are problems that it is necessary to individually change the specifications of the human body detection sensor, and the human body detection sensor cannot be shared.

Thus, an object of the disclosure is to provide a detection range specification member for the human body detection sensor that is capable of easily specifying the detection range of a human body detection sensor without changing the specifications of the human body detection sensor and a toilet including the detection range specification member for the human body detection sensor.

A detection range specification member for a human body detection sensor according to the disclosure is provided in a washroom, includes a material that reduces transmission of infrared rays, and is provided so as to cover at least a part of an infrared sensor body of the human body detection sensor having the infrared sensor body configured to detect a human body, and specifies a detection range of the human body detection sensor.

In the disclosure, the detection range specification member for the human body detection sensor includes the material that reduces the transmission of the infrared rays, and is provided so as to cover at least a part of the infrared sensor body. Accordingly, it is possible to adopt a configuration in which the human body detection sensor does not detect a human body or not detect the human body easily in at least a part of a range capable of being detected by the human body detection sensor corresponding to a portion provided with the detection range specification member for the human body detection sensor.

In this way, in the disclosure, the detection range of the human body detection sensor is capable of being easily specified without changing the specifications of the human body detection sensor.

By adjusting the range in which the detection range specification member for the human body detection sensor covers the infrared sensor body and the transmittance of infrared rays of the detection range specification member for the human body detection sensor, the detection range of the human body detection sensor is capable of being individually specified even in a case where a common human body detection sensor is used.

The detection range specification member for the human body detection sensor having the same form is capable of being used for human body detection sensors having different specifications.

Moreover, since it is not necessary to change the specifications of the human body detection sensor itself, it is possible to easily specify the detection range of the human body detection sensor as needed at a site where the human body detection sensor is installed. For this reason, even in the existing human body detection sensor, the detection range is capable of being easily specified.

Additionally, the detection range specification member for the human body detection sensor according to the disclosure may be a sheet member that is configured to allow installation on a detection surface side of the infrared sensor body.

With such a configuration, the detection range specification member for the human body detection sensor is capable of being easily installed without interfering with the infrared sensor body. The same detection range specification member for the human body detection sensor is capable of being used for human body detection sensors having different specifications.

Additionally, in the detection range specification member for the human body detection sensor according to the disclosure, the human body detection sensor may be provided in a toilet, and the sheet member may be configured to allow fitting into a recessed portion formed in the toilet.

With such a configuration, the sheet member is capable of being easily installed.

The detection range specification member for the human body detection sensor according to the disclosure may be a cover member that is attachable to and detachable from the infrared sensor body so as to cover a detection surface side of the infrared sensor body.

With such a configuration, the detection range specification member for the human body detection sensor is capable of being easily installed in the infrared sensor body.

In the detection range specification member for the human body detection sensor according to the disclosure, the cover member may have an engagement part that is capable of being engaged with the human body detection sensor.

With such a configuration, the cover member is capable of being reliably installed in the infrared sensor body.

The detection range specification member for the human body detection sensor according to the disclosure may include polyethylene as a material, and may be configured to allow installation for covering the entire infrared sensor body.

With such a configuration, the detection performance of the infrared sensor body is capable of being diminished as a whole, and the distance that the infrared sensor body is capable of detecting from the infrared sensor body is capable of being shortened as a whole.

A toilet according to the disclosure includes a human body detection sensor having an infrared sensor body that is configured to detect a human body; and the detection range specification member for the human body detection sensor that specifies a detection range of the human body detection sensor.

Accordingly, it is possible to make the human body detection sensor not detect a human body or make it difficult to detect the human body in at least a part of a range capable of being detected by the human body detection sensor corresponding to a portion provided with the detection range specification member for the human body detection sensor.

In this way, in the disclosure, it is possible to provide the toilet that is capable of easily specifying the detection range of the human body detection sensor without changing the specifications of the human body detection sensor.

According to the detection range specification member for the human body detection sensor and the toilet according to the disclosure, the detection range of the human body detection sensor is capable of being easily specified.

DETAILED DESCRIPTION OF THE DISCLOSURE

Hereinafter, a detection range specification member for a human body detection sensor and a toilet according to some embodiments of the disclosure will be described with reference to FIGS. 1 to 7.

Figure 1:
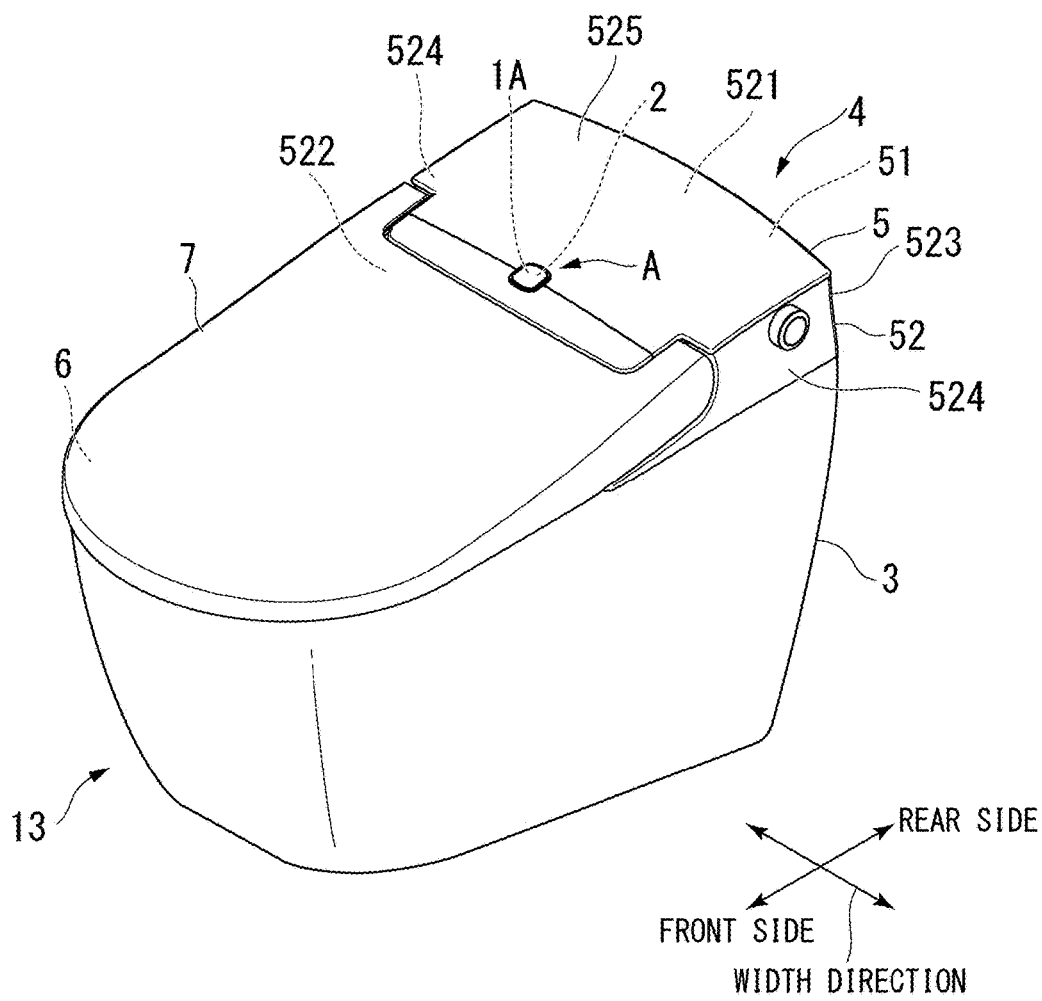
FIG. 1 is a perspective view showing an example of a toilet according to some embodiments.
Figure 2:
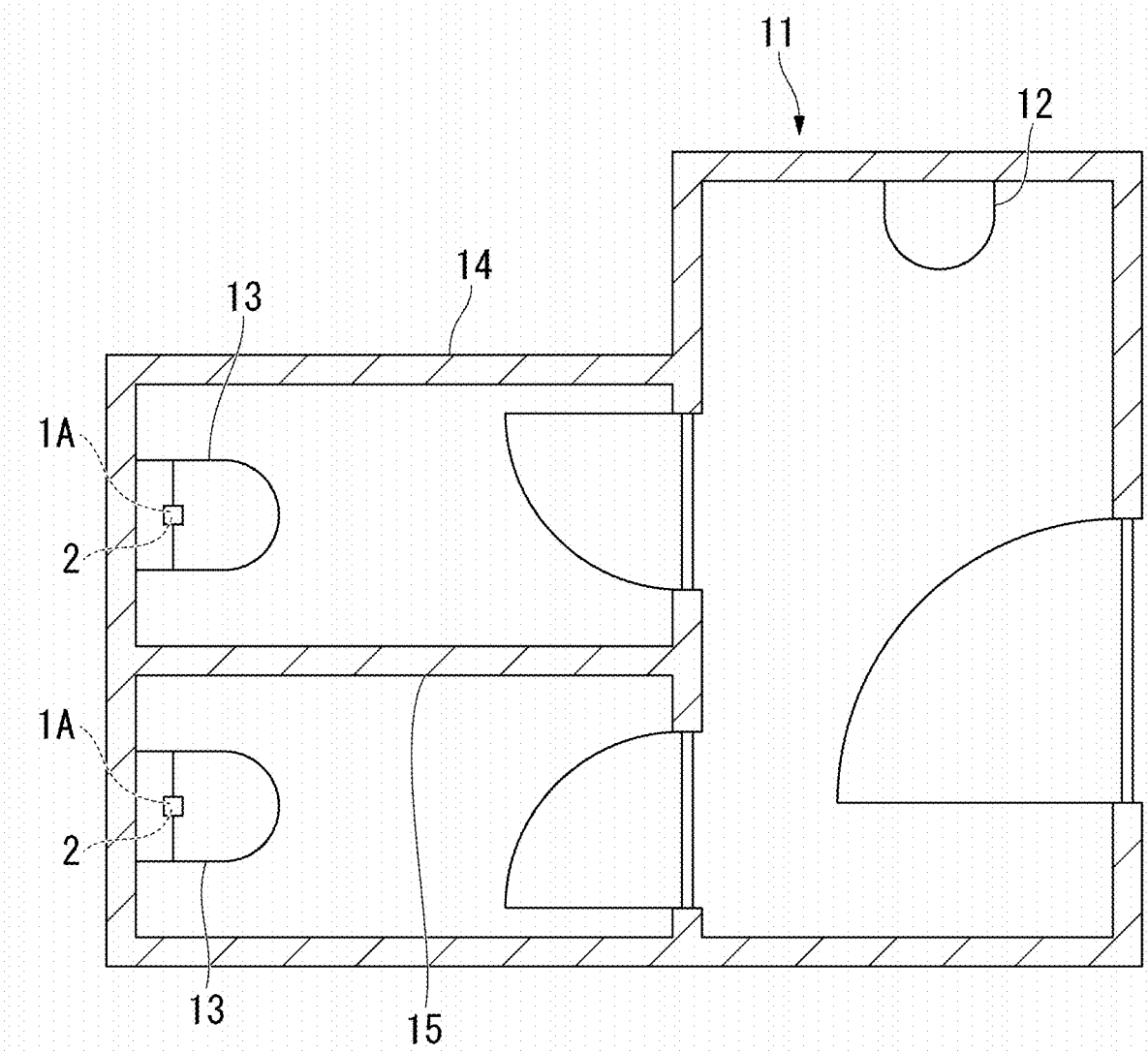
FIG. 2 is a plan view of an example of a toilet space according to some embodiments.

As shown in FIGS. 1 and 2, the detection range specification member for the human body detection sensor 1A according to some embodiments is provided to specify a detection range of a human body detection sensor 2 provided in a toilet space 11 (washroom including a sanitary space, refer to FIG. 2).

As shown in FIG. 2, one urinal 12 and two western style toilets 13 are provided in the toilet space 11. In the toilet space 11, a wall 14 is provided on an outer peripheral part and a partition wall 15 separating the two western style toilets 13 is provided.

In some embodiments, the human body detection sensor 2 is provided for each of the two western style toilets 13. Hereinafter, the western style toilet 13 at which the human body detection sensor 2 is provided is referred to as a toilet 13.

As shown in FIG. 1, the toilet 13 includes a toilet body 3 having a toilet bowl formed therein, and a toilet seat device 4 installed in the toilet body 3. The toilet seat device 4 has a main body 5, a toilet seat 6, and a toilet lid 7. The main body 5 is installed at an upper rear part of the toilet body 3. The toilet seat 6 is pivotably attached to the main body 5. The toilet lid 7 is pivotably attached to the main body 5 and is opened and closed above the toilet seat 6.

In the following, a description will be made with a side where a user who uses the toilet 13 is located with respect to the toilet 13 as a front side in the front-rear direction, a side where the toilet 13 is located with respect to the user as a rear side in the front-rear direction, and a horizontal direction orthogonal to the front-rear direction as the width direction, when the toilet 13 is used.

The main body 5 has a functional unit 51 having various functions, and a case 52 accommodating the functional unit 51.

The functional unit 51 comprises a toilet seat pivot unit for pivoting the toilet seat 6, a toilet lid pivot unit for pivoting the toilet lid 7, various functional devices and various functional components such as a local cleaning device and a deodorizing device, a control unit that controls the various functional devices and various functional components, a power supply unit that supplies power to the various functional devices and various functional components, and the like.

The human body detection sensor 2 is provided in the functional unit 51. In some embodiments, when the human body detection sensor 2 detects a human body, the control unit makes a control such that the toilet lid 7 is opened (an upper part of the toilet seat 6 is opened). For this reason, the human body detection sensor 2 is configured to be capable of communicating a detection signal to the control unit.

The case 52 has a case upper plate part 521, a case front plate part 522, a case rear plate part 523, a pair of case side plate parts 524, and a case cover plate part 525.

The case upper plate part 521 is disposed above the functional unit 51. The case front plate part 522 is disposed on a front side of the functional unit 51. The case rear plate part 523 is disposed on a rear side of the functional unit 51. The pair of case side plate parts 524 is disposed on both sides of the functional unit 51 in the width direction. The case cover plate part 525 covers an upper surface of the case upper plate part 521.

The case upper plate part 521, the case front plate part 522, the case rear plate part 523, and the case side plate part 524 are integrally formed.

Figure 3:
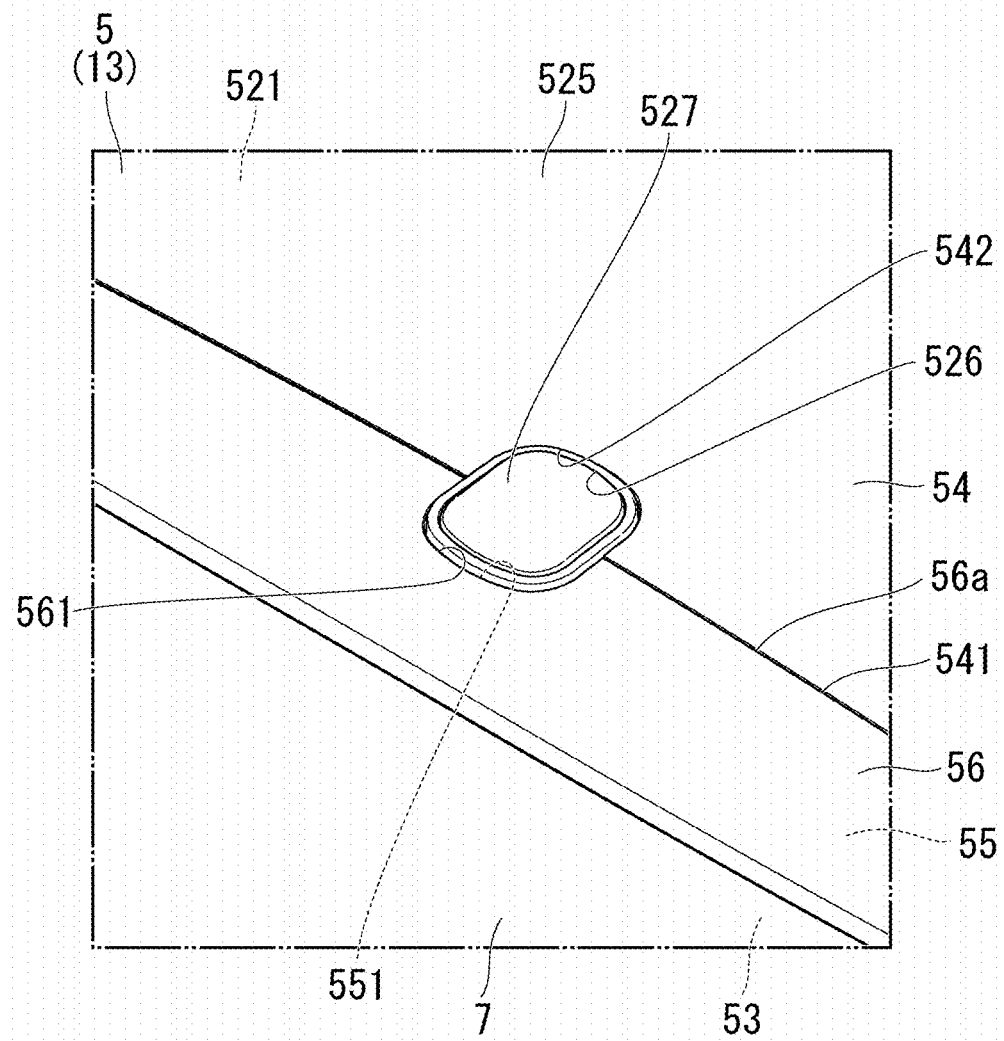
FIG. 3 is an enlarged view of portion A of FIG. 1 according to some embodiments.
Figure 4:
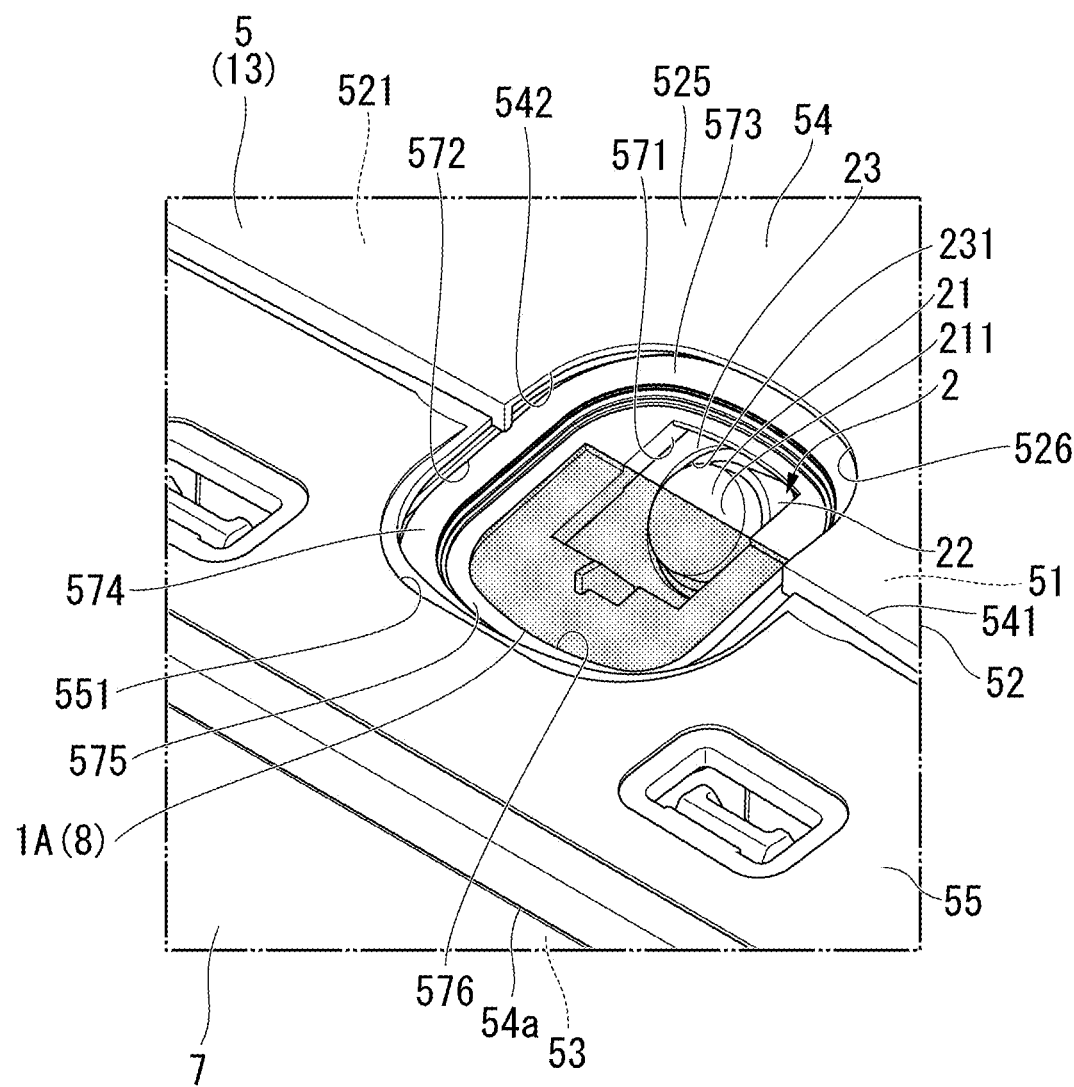
FIG. 4 is a perspective view showing a main body, a human body detection sensor, and a sheet member according to some embodiments.

As shown in FIGS. 3 and 4, the case cover plate part 525 includes a first cover plate part 53, a second cover plate part 54, a third cover plate part 55, and a fourth cover plate part 56 (refer to FIG. 3).

The first cover plate part 53 covers the vicinity of a front edge of the upper surface of the case upper plate part 521.

The second cover plate part 54 covers a portion excluding the vicinity of the front edge of the upper surface of the case upper plate part 521. The third cover plate part 55 covers the vicinity of a front edge of an upper surface of the second cover plate part 54. The fourth cover plate part 56 covers an upper surface of the third cover plate part 55.

When the toilet lid 7 is brought into a closed state, the first cover plate part 53 is disposed below the toilet lid 7. In FIG. 4, the fourth cover plate part 56 is omitted. FIG. 4 illustrates the front edge 54a of the second cover plate part 54.

The vicinity of the front edge of the case cover plate part 525 is configured, in some embodiments, only by the first cover plate part 53. The rear side of the case cover plate part 525 has a triple structure of the second cover plate part 54, the third cover plate part 55, and the fourth cover plate part 56. Moreover, the rear side of the case cover plate part 525 is composed, in some embodiments, of only the second cover plate part 54.

A stepped part 541 is formed at an intermediate part on the upper surface of the second cover plate part 54 in the front-rear direction. The front side of the stepped part 541 is lower than a rear side of the stepped part 541. The third cover plate part 55 and the fourth cover plate part 56 are overlapped with each other and are disposed above the portion of the second cover plate part 54 in front of the stepped part 541.

The fourth cover plate part 56 is disposed such that a rear end 56a faces the stepped part 541. An upper surface of the fourth cover plate part 56 is flush with an upper surface of the rear portion of the second cover plate part 54 behind the stepped part 541.

Figure 5:
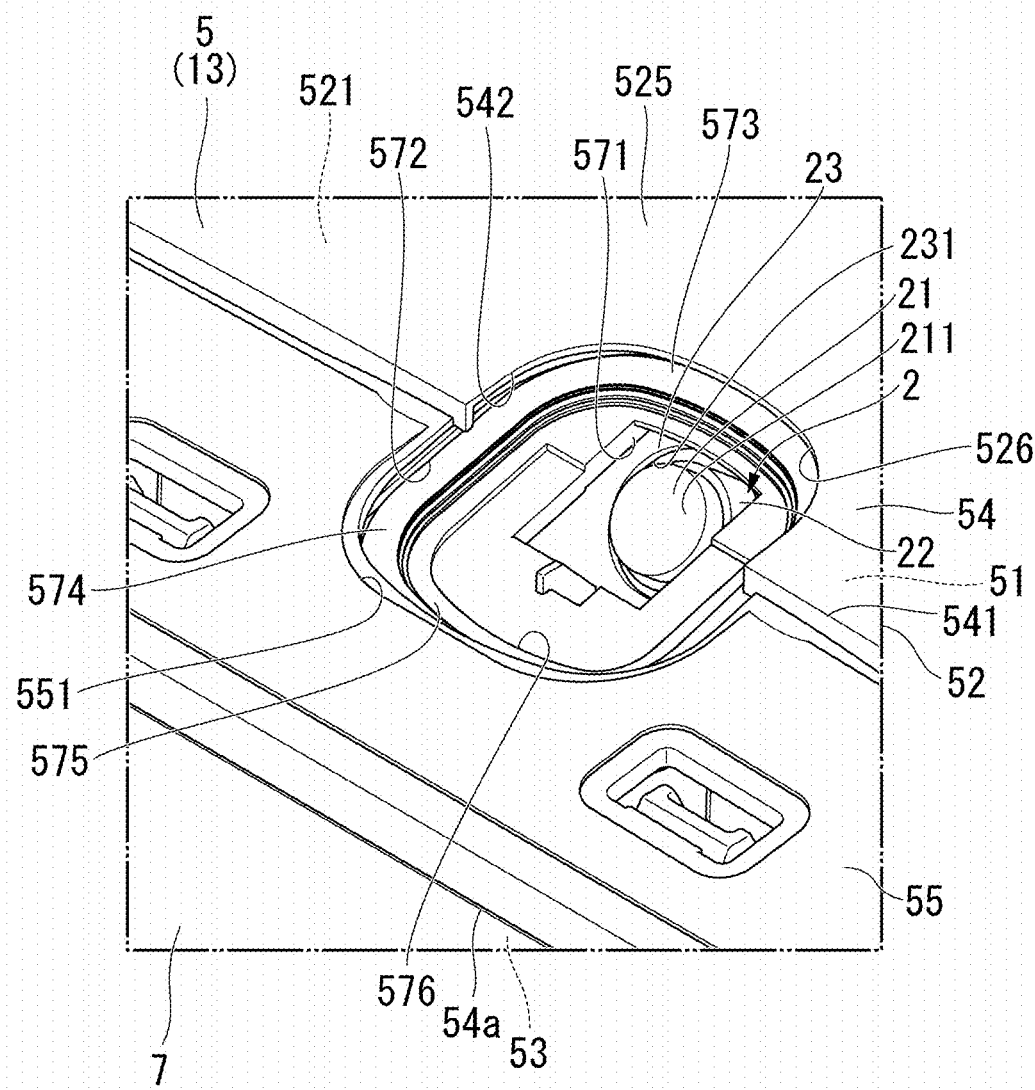
FIG. 5 is a perspective view showing the main body and the human body detection sensor according to some embodiments.

As shown in FIGS. 4 and 5, the human body detection sensor 2 is provided above a front part of the functional unit 51 and substantially at the center in the width direction. The human body detection sensor 2 is disposed below the stepped part 541 of the second cover plate part 54.

A human body detection sensor hole 526 is formed in the case 52. The human body detection sensor hole 526 penetrates the case upper plate part 521 and the case cover plate part 525 in the up-down direction at a position above the human body detection sensor 2.

The human body detection sensor hole 526 includes a case upper plate hole 571, a second cover plate hole 542, a third cover plate cutout 551, and a fourth cover plate cutout 561 (refer to FIG. 3). The case upper plate hole 571 penetrates the case upper plate part 521 in the up-down direction. The second cover plate hole 542 penetrates the second cover plate part 54 in the up-down direction. The third cover plate cutout 551 penetrates the third cover plate part 55 in the up-down direction and opens to the rear side. The fourth cover plate cutout 561 penetrates the fourth cover plate part 56 in the up-down direction and opens to the rear side.

The case upper plate hole 571 is formed substantially at the center in the width direction in a front portion of the case upper plate part 521.

The second cover plate hole 542 is formed substantially at the center in the width direction in a front portion of the second cover plate part 54. The second cover plate hole 542 is disposed above the case upper plate hole 571.

The third cover plate cutout 551 is formed substantially at the center in the width direction in the vicinity of a rear end of the third cover plate part 55. The third cover plate cutout 551 is disposed above a front portion of the second cover plate hole 542. The third cover plate cutout 551 is formed to have substantially the same size as the front portion of the second cover plate hole 542.

The fourth cover plate cutout 561 is formed substantially at the center in the width direction in the vicinity of a front end of the fourth cover plate part 56. The fourth cover plate cutout 561 is disposed above the third cover plate cutout 551. The fourth cover plate cutout 561 is formed to have substantially the same size as the third cover plate cutout 551.

The case upper plate hole 571 is formed to be smaller than the second cover plate hole 542. An edge of the case upper plate hole 571 is disposed inside the edge of the second cover plate hole 542 and an edge of the third cover plate cutout 551 (the side toward the center of the human body detection sensor hole 526).

In the case upper plate part 521, a rib 572 is formed in an outside of the case upper plate hole 571, and the rib 572 that protrudes upward is formed at a position substantially overlapping the edge of the second cover plate hole 542 when the second cover plate part 54 is disposed on the upper side. The rib 572 has an annular shape when viewed in the up-down direction, and the rib 572 is formed outside the case upper plate hole 571. A portion of the case upper plate part 521 which is inside the rib 572 and which is outside the case upper plate hole 571 is referred to as a rib inner plate part 573.

The rib inner plate part 573 includes a first rib inner plate part 574 and a second rib inner plate part 575. The first rib inner plate part 574 is an outer peripheral portion along the rib 572. The second rib inner plate part 575 is formed in an inside of the first rib inner plate part 574 and is an inner portion that extends along the edge of the case upper plate hole 571.

The plate thickness of the second rib inner plate part 575 is formed to be smaller than the plate thickness of the first rib inner plate part 574. An upper surface of the second rib inner plate part 575 is recessed below an upper surface of the first rib inner plate part 574.

A recessed portion 576 having a further reduced plate thickness is formed in a front portion of the second rib inner plate part 575. The recessed portion 576 is disposed along an edge of a front portion of the case upper plate hole 571, and the shape of the case upper plate hole 571 as viewed from above is a U shape formed by a portion disposed on a front side of the case upper plate hole 571 and portions on both sides of the front portion of the case upper plate hole 571 in the width direction.

An edge of the recessed portion 576 is disposed inside a boundary between the first rib inner plate part 574 and the second rib inner plate part 575.

As shown in FIG. 4, the detection range specification member for the human body detection sensor 1A is capable of being configured to allow installation into the recessed portion 576.

Figure 6:
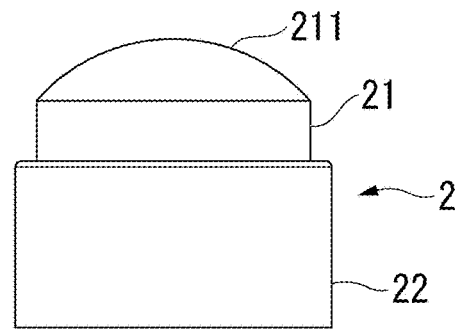
FIG. 6 is a side view of the human body detection sensor according to some embodiments.

As shown in FIGS. 4 to 6, the human body detection sensor 2 has an infrared sensor body 21 that is an infrared sensor, and a sensor body support 22 that supports the infrared sensor body 21.

The sensor body support 22 is formed in a columnar shape. The infrared sensor body 21 is formed in a columnar shape, and is curved such that an end surface on a first side in an axis direction protrudes outward. A curved surface of the infrared sensor body 21 on the first side in the axis direction is referred to as a sensor surface (detection surface) 211. The human body detection sensor 2 is configured to detect a human body (heat) from the sensor surface 211 side.

The infrared sensor body 21 is coupled to the sensor body support 22 on the first side in the axis direction so as to be arranged coaxially with the sensor body support 22. The side opposite to the side where the sensor surface 211 of the sensor body 21 is formed is connected to the sensor body support 22.

As shown in FIGS. 4 and 5, the human body detection sensor 2 is provided above a front part of the functional unit 51 and substantially at the center in the width direction. The human body detection sensor 2 is disposed below the stepped part 541 of the second cover plate part 54.

A sensor fixing part 23 to which the human body detection sensor 2 is fixed is provided above the front part of the functional unit 51 and substantially at the center in the width direction. A recessed portion 231 that opens forward and upward is formed in the sensor fixing part 23. The sensor fixing part 23 is configured such that the sensor body support 22 of the human body detection sensor 2 is inserted into and fixed to the recessed portion 231.

The sensor surface 211 of the human body detection sensor 2 fixed to the sensor fixing part 23 faces a front upper side.

As shown in FIG. 3, a sensor cover 527 capable of closing the human body detection sensor hole 526 from the upper side is detachably provided on the case cover plate part 525.

The sensor cover 527 is formed in a plate shape corresponding to the second cover plate hole 542, the third cover plate cutout 551, and the fourth cover plate cutout 561. The sensor cover 527 is configured to be capable of being fitted to the second cover plate hole 542, the third cover plate cutout 551, and the fourth cover plate cutout 561.

Even if the sensor cover 527 is fitted to the second cover plate hole 542, the third cover plate cutout 551, and the fourth cover plate cutout 561, the sensor cover 527 is not fitted to the case upper plate hole 571 (refer to FIGS. 4 and 5) and is disposed above the case upper plate hole 571. The sensor cover 527 includes a material such as high-density polyethylene that is capable of transmitting infrared rays.

The detection range specification member for the human body detection sensor 1A shown in FIG. 4 is composed of a sheet member 8 in which PET (polyethylene terephthalate) or the like having a small infrared ray transmittance is formed in a sheet shape. The sheet member 8 is formed with a size capable of covering the recessed portion 576 of the second rib inner plate part 575 and the front portion of the case upper plate hole 571. The sheet member 8 is configured to be fitted into the recessed portion 576 of the second rib inner plate part 575. The sheet member 8 fitted into the recessed portion 576 of the second rib inner plate part 575 does not easily move in the horizontal direction due to a step difference between the second rib inner plate part 575 and the recessed portion 576.

Since the sheet member 8 fitted into the recessed portion 576 of the second rib inner plate part 575 covers the front portion of the case upper plate hole 571, the sheet member 8 is disposed so as to overlap with a front lower portion of the infrared sensor body 21.

An adhesive tape for adhering to a bottom surface of the recessed portion 576 of the second rib inner plate part 575 may be provided on a lower surface of the sheet member 8.

As described above, in some embodiments, the sheet member 8 covers the front portion of the case upper plate hole 571, so that a substantially lower half of the infrared sensor body 21 of the human body detection sensor 2 is covered. Accordingly, only a substantially upper half of the infrared sensor body 21 detects the human body, and the substantially lower half of the infrared sensor body 21 does not detect the human body.

Figure 7:
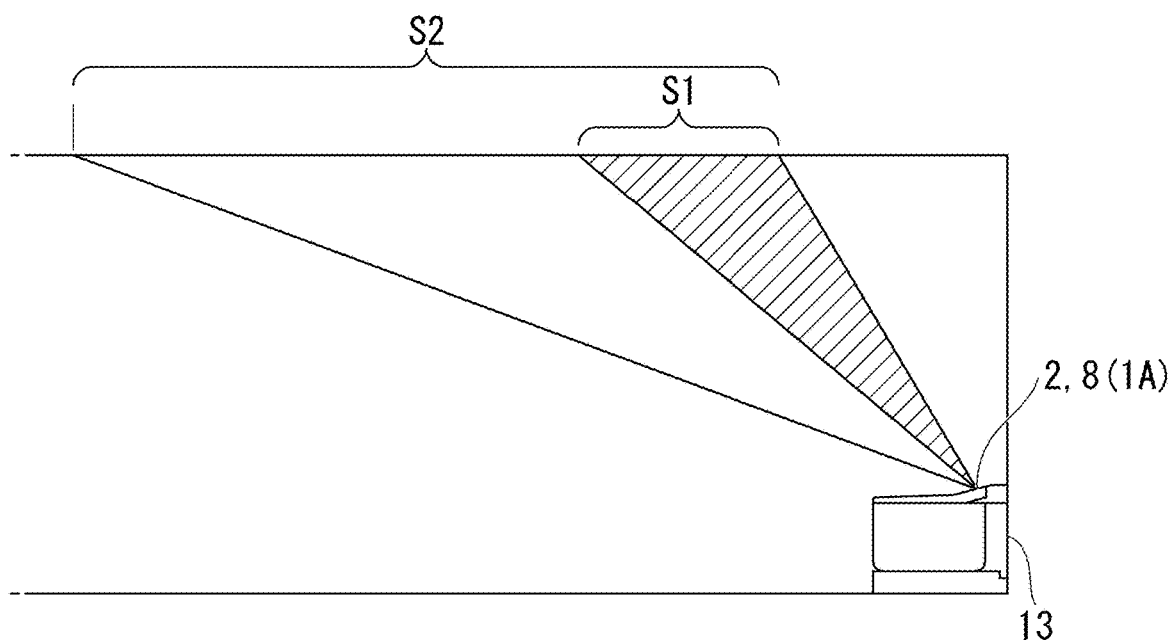
FIG. 7 is a view showing a detection range of the human body detection sensor according to some embodiments.

For this reason, as shown in FIG. 7, when the detection range for detecting the human body by the human body detection sensor 2 of some embodiments is S1, and the detection range for detecting a human body by the human body detection sensor in a case where the substantially lower half of the infrared sensor body 21 is not covered with the sheet member 8 is S2, the detection range S1 is a rear portion of the range S2 of the human body detection sensor in a case where the substantially lower half of the infrared sensor body 21 is not covered with the sheet member 8. In some embodiments, the human body detection sensor 2 does not make a detection unless a user approaches the toilet 13, as compared to a case where the substantially lower half of the infrared sensor body 21 is not covered with the sheet member 8.

For example, when the detection range S2 includes a region outside a private room where the toilet 13 is provided, the human body detection sensor also detects a user outside the private room. However, in some embodiments, the detection range S1 of the human body detection sensor 2 is capable of being specified only inside the private room by covering substantially the substantially lower half of the infrared sensor body 21 with the sheet member 8. Accordingly, it is possible to prevent the human body detection sensor from detecting the user outside the private room.

Next, the operation and effects of the detection range specification member for the human body detection sensor and the toilet according to some embodiments will be described with reference to the drawings.

The detection range specification member for the human body detection sensor 1A (sheet member 8) according to some embodiments includes a material that reduces the transmission of infrared rays, and is provided so as to cover at least a part of the infrared sensor body 21. Accordingly, it is possible to make a specification such that the human body detection sensor 2 does not detect a human body in a part of a range capable of being detected by the human body detection sensor 2 corresponding to a portion provided with the sheet member 8.

In this way, in some embodiments, the detection range of the human body detection sensor 2 is capable of being easily specified without changing the specifications of the human body detection sensor 2 itself.

Additionally, since the sheet member 8 is provided separately from the human body detection sensor 2, the sheet member 8 having the same form is capable of being used for the human body detection sensors 2 having different specifications.

Moreover, since it is not necessary to change the specifications of the human body detection sensor 2 itself, it is possible to easily specify the detection range of the human body detection sensor 2 as needed at a site where the human body detection sensor 2 is installed. For this reason, the detection range of the existing human body detection sensor 2 is also capable of being easily specified.

Additionally, since the sheet member 8 is provided at a position separated from the human body detection sensor 2, the sheet member 8 capable of being easily installed without interfering with the infrared sensor body 21.

Additionally, the human body detection sensor 2 is provided in the toilet 13, and the sheet member 8 is configured so as to be capable of being fitted into the recessed portion 576 formed in the case 52 of the toilet seat device 4, so that the sheet member 8 is capable of being easily installed.

Next, additional embodiments will be described with reference to the accompanying drawings. However, the same or similar members and portions as those in some embodiments will be denoted by the same reference signs, and the description thereof will be omitted, and a configuration different from that of the configurations described above will be described.

Figure 8:
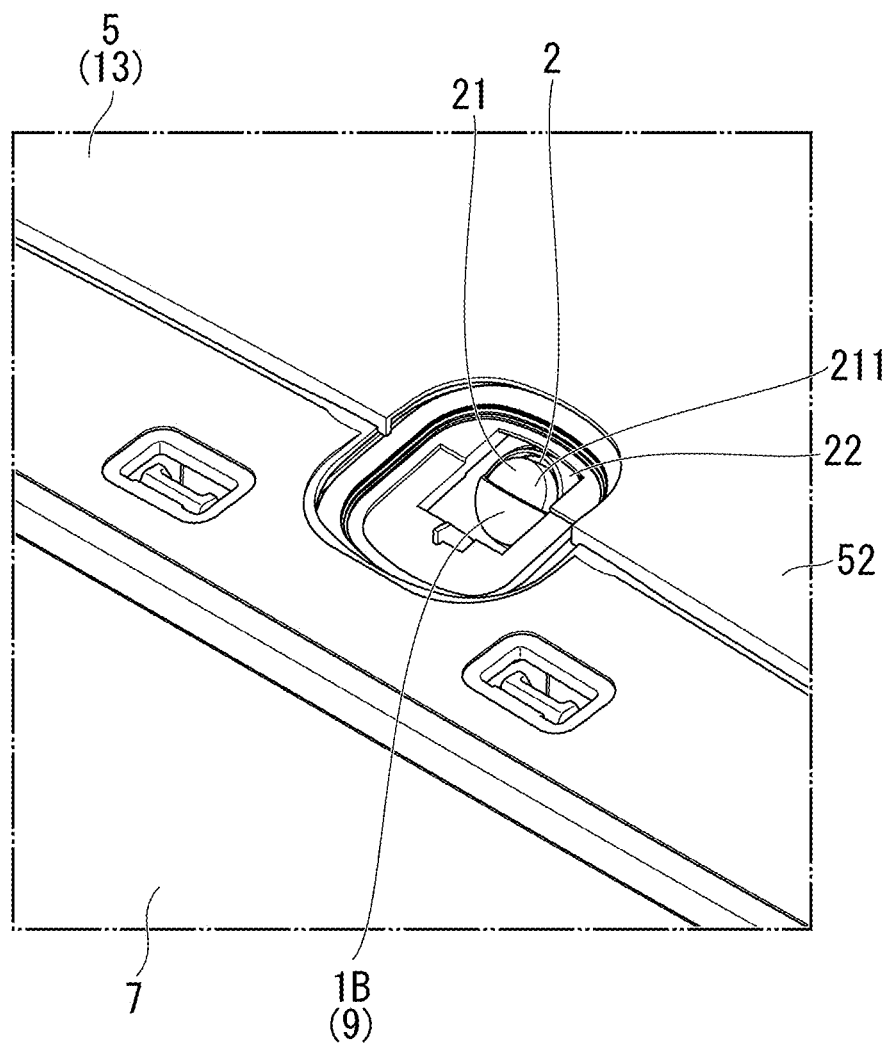
FIG. 8 is a perspective view showing a main body, a human body detection sensor, and a cover member according to some embodiments.

As shown in FIG. 8, a detection range specification member for the human body detection sensor 1B according to some embodiments includes a cover member 9 that is attachable to and detachable from the infrared sensor body 21. The cover member 9 covers the sensor surface 211 of the infrared sensor body 21 provided on the toilet 13.

Figure 9:
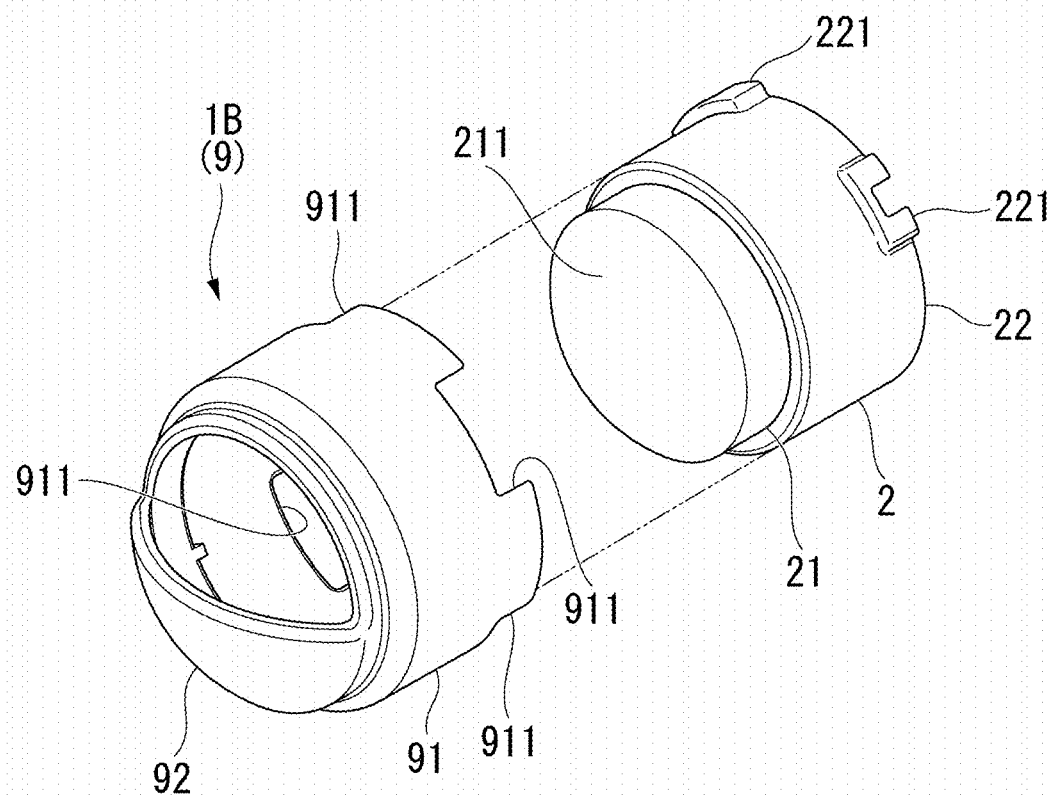
FIG. 9 is a perspective view showing the human body detection sensor and the cover member according to some embodiments.

As shown in FIG. 9, the cover member 9 has a sensor attachment part 91 and a cover body 92. The sensor attachment part 91 is attached to the sensor body support 22 of the human body detection sensor 2. The cover body 92 is supported by the sensor attachment part 91 and covers the infrared sensor body 21.

The sensor attachment part 91 has a cylindrical shape and is formed with such a dimension that the sensor body support 22 is capable of being inserted thereinto. The cover body 92 is connected to a first side of the sensor attachment part 91 in the axis direction. The cover body 92 has a substantially semicircular shape when viewed in the axis direction of the sensor attachment part 91, and is formed in a plate shape that is curved to the first side of the sensor attachment part 91 in the axis direction. The cover body 92 closes approximately half of an opening on the first side of the sensor attachment part 91 on the axis direction.

In some embodiments, the sensor attachment part 91 and the cover body 92 are integrally formed and include, for example, ABS resin, polycarbonate, acrylic resin, or the like.

Four cutouts (engagement parts) 911 are formed on a second side of the sensor attachment part 91 in the axis direction. The four cutouts 911 are open on the second side in the axis direction at intervals of 90° in the circumferential direction. The four cutouts 911 are formed in the same shape.

Two protruding parts 221 are formed on a second side (a side to which the infrared sensor body 21 is not connected) of the sensor body support 22 of the human body detection sensor 2 in the axis direction. The two protruding parts 221 protrude outward in the radial direction and are formed at positions spaced apart by 90° in the circumferential direction. The two protruding parts 221 are formed in the same shape.

The four cutouts 911 of the sensor attachment part 91 are configured to be respectively fittable to the two protruding parts 221 of the sensor body support 22 of the human body detection sensor 2.

The cover member 9 is attached to the human body detection sensor 2 as follows.

The infrared sensor body 21 and the sensor body support 22 are inserted into the sensor attachment part 91 by causing the second side of the sensor attachment part 91 of the cover member 9 in the axis direction (the side to which the cover body 92 is not connected) to face the infrared sensor body 21 in a posture coaxial with the human body detection sensor 2 and moving the cover member 9 toward the human body detection sensor 2.

The protruding parts 221 of the sensor body support 22 are inserted into two cutouts 911 of the four cutouts 911 of the sensor attachment part 91 to fit the cutouts 911 and the sensor body support 22 to each other.

In this case, the cover body 92 of the cover member 9 covers the surface of the infrared sensor body 21. Since the cover body 92 has a smaller shape when viewed in the axis direction than the infrared sensor body 21, the cover body 92 covers a part of the sensor surface 211 of the infrared sensor body 21. The cover body 92 is disposed so as to cover a desired position of the infrared sensor body 21, and specifies the detection range of the human body detection sensor 2.

Since the four cutouts 911 are formed in the sensor attachment part 91, two adjacent cutouts 911 of the four cutouts 911 is capable of being fitted to the protruding parts 221 of the sensor body support 22. For this reason, the circumferential position where the cover member 9 is attached to the human body detection sensor 2 is capable of being set to any position every 90°.

The detection range specification member for the human body detection sensor 1B and the toilet 13 according to some embodiments may have the same effects as those described elsewhere herein.

Additionally, since the detection range specification member for the human body detection sensor 1B is the cover member 9 that is attachable to and detachable from the infrared sensor body 21 so as to cover the sensor surface 211 of the infrared sensor body 21, the detection range specification member for the human body detection sensor 1B is capable of being easily installed in the infrared sensor body 21.

Additionally, since the cover member 9 has the engagement parts that are capable of being engaged with the human body detection sensor 2, the cover member 9 is capable of being reliably installed in the infrared sensor body 21.

Although in some embodiments of the detection range specification member for the human body detection sensor and the toilet according to the disclosure have been described above, the disclosure is not limited to the above-described embodiments and is capable of being appropriately modified without departing from the spirit of the disclosure.

For example, in some embodiments described above, the detection range specification member for the human body detection sensor 1A is the sheet member 8 that is capable of being installed in the sensor surface 211 side of the infrared sensor body 21, and in some embodiments, the detection range specification member for the human body detection sensor 1B is the cover member 9 that is attachable to and detachable from the infrared sensor body 21 so as to cover the sensor surface 211 of the infrared sensor body 21. However, the detection range specification member is not limited to the sheet member 8 or the cover member 9. Any form may be adopted as long as the detection range specification member is capable of covering the infrared sensor body 21.

Additionally, in some embodiments, the sheet member 8 is configured so as to be fittable into the recessed portion 576 formed in the case 52 of the toilet seat device 4. However, the recessed portion 576 may not be formed in the case 52 of the toilet seat device 4. Additionally, the case 52 may be provided with, for example, a mechanism that supports the sheet member 8 such as a claw part that sandwiches the sheet member 8 in addition to the recessed portion 576.

Additionally, in some embodiments, the cover member 9 is provided with the cutout 911, the sensor body support 22 of the human body detection sensor 2 is provided with the protruding parts 221, and the cutouts 911 are configured so as to be fitted to and engaged with the protruding parts 221. In contrast, the cover member 9 may not be provided with the cutouts 911, and the sensor body support 22 may not be provided with the protruding parts 221. Additionally, the cover member 9 may have engagement parts that are capable of being engaged with the human body detection sensor 2 other than the cutouts 911.

Additionally, in some embodiments, the detection range specification members for the human body detection sensors 1A and 1B include a material that does not transmit infrared rays and are provided so as to cover a part of the infrared sensor body 21, but may include a material (for example, high-density polyethylene or the like) that reduces the transmission of infrared rays, and may be provided so as to cover the entire infrared sensor body 21. With this configuration, the detection function of the human body detection sensor 2 is capable of being diminished as a whole, and accordingly the detection range of the human body detection sensor 2 is capable of being reduced as a whole.

Additionally, in some embodiments, the detection range specification member for the human body detection sensors 1A and 1B specify the detection range of the human body detection sensor 2 provided in the toilet 13 of the toilet space 11 in which the plurality of toilets 13 are provided, but may be configured so as to specify the detection range of the human body detection sensor 2 provided in the toilet 13 in a washroom (including a sanitary space) provided with the toilet 13, a washbasin, a bathtub, and the like.

Additionally, in some embodiments, the toilet lid 7 of the toilet 13 is configured to be opened when the human body detection sensor 2 detects a human body. However, in addition to opening the toilet lid 7, a configuration may be adopted in which a light is turned on and ventilation of the washroom is performed.

According to the disclosure, the detection range of the human body detection sensor is capable of being easily specified.

What is claimed is:

1. A detection range specification member for a human body detection sensor, comprising a material that reduces transmission of infrared rays;
    wherein the detection range specification member is provided in a washroom;
    wherein the detection range specification member covers at least a part of an infrared sensor body of the human body detection sensor and specifies a detection range of the human body detection sensor, and
    wherein the detection range specification member is a sheet member that is configured to allow installation on a detection surface side of the infrared sensor body.

2. The detection range specification member for the human body detection sensor of claim 1, wherein the human body detection sensor is provided in a toilet, and
    wherein the sheet member is configured to allow fitting into a recessed portion formed in the toilet.

3. The detection range specification member for the human body detection sensor of claim 1, wherein the detection range specification member is a cover member that is attachable to and detachable from the infrared sensor body so as to cover a detection surface side of the infrared sensor body.

4. The detection range specification member for the human body detection sensor of claim 3, wherein the cover member has an engaged part that is capable of being engaged with the human body detection sensor.

5. The detection range specification member for the human body detection sensor of claim 1, wherein the detection range specification member includes polyethylene, and is configured to allow installation for covering the entire infrared sensor body.

6. A toilet comprising:
    a human body detection sensor having an infrared sensor body that is configured to detect a human body; and
    the detection range specification member for the human body detection sensor of claim 1 that specifies a detection range of the human body detection sensor.

7. The detection range specification member for the human body detection sensor of claim 1, wherein the detection range specification member includes polyethylene, and is configured to allow installation for covering the entire infrared sensor body.

8. The detection range specification member for the human body detection sensor of claim 2, wherein the detection range specification member includes polyethylene, and is configured to allow installation for covering the entire infrared sensor body.

9. The detection range specification member for the human body detection sensor of claim 3, wherein the detection range specification member includes polyethylene, and is configured to allow installation for covering the entire infrared sensor body.

10. The detection range specification member for the human body detection sensor of claim 4, wherein the detection range specification member includes polyethylene, and is configured to allow installation for covering the entire infrared sensor body.

11. The detection range specification member for the human body detection sensor of claim 1, wherein the detection range specification member is provided between the infrared sensor body and a sensor cover configured to cover the detection surface side of the infrared sensor body.

12. A detection range specification member for a human body detection sensor, comprising a material that reduces transmission of infrared rays;
    wherein the detection range specification member is provided in a washroom;
    wherein the detection range specification member covers at least a part of an infrared sensor body of the human body detection sensor and specifies a detection range of the human body detection sensor,
    wherein the detection range specification member is a sheet member that is configured to allow installation on a detection surface side of the infrared sensor body,
    wherein the human body detection sensor is provided in a toilet, and
    wherein the sheet member is configured to allow fitting into a recessed portion formed in the toilet.

* * * * *